US011827055B2

(12) United States Patent
Denmead et al.

(10) Patent No.: US 11,827,055 B2
(45) Date of Patent: Nov. 28, 2023

(54) COMPOSITE WHEEL WITH IMPROVED MOUNTING FORMATION

(71) Applicant: CARBON REVOLUTION LIMITED, Waurn Ponds (AU)

(72) Inventors: Ashley James Denmead, Belmont (AU); Michael Dunbar Silcock, Wallington (AU); Timothy Corbett, Highton (AU); Nicholas Taylor, Waurn Ponds (AU)

(73) Assignee: Carbon Revolution Limited, Victoria (AU)

( * ) Notice: Subject to any disclaimer, the term of this patent is extended or adjusted under 35 U.S.C. 154(b) by 674 days.

(21) Appl. No.: 16/639,454

(22) PCT Filed: Jul. 31, 2018

(86) PCT No.: PCT/AU2018/050794
§ 371 (c)(1),
(2) Date: Feb. 14, 2020

(87) PCT Pub. No.: WO2019/033151
PCT Pub. Date: Feb. 21, 2019

(65) Prior Publication Data
US 2020/0391542 A1 Dec. 17, 2020

(30) Foreign Application Priority Data
Aug. 18, 2017 (AU) ................................ 2017903336

(51) Int. Cl.
*B60B 5/02* (2006.01)
*B60B 3/00* (2006.01)
(Continued)

(52) U.S. Cl.
CPC ................ *B60B 5/02* (2013.01); *B60B 3/004* (2013.01); *B60B 3/16* (2013.01); *B60B 3/10* (2013.01);
(Continued)

(58) Field of Classification Search
CPC ............ B60B 5/02; B60B 3/004; B60B 3/16; B60B 2310/52; B60B 2360/36
See application file for complete search history.

(56) References Cited

U.S. PATENT DOCUMENTS

| 3,811,737 | A | * | 5/1974 | Lejeune | .................... B60B 5/02 301/35.632 |
| 3,917,352 | A | * | 11/1975 | Gageby | ................... B29C 70/24 301/64.702 |
| 2012/0153709 | A1 | * | 6/2012 | Walthert | ................... B60B 5/02 301/95.102 |

(Continued)

FOREIGN PATENT DOCUMENTS

| DE | 1939910 A1 | 2/1971 |
| DE | 19940524 A1 | 4/2001 |

(Continued)

OTHER PUBLICATIONS

Extended European Search Report in European Application No. 18846090.1 dated Jul. 2, 2020.

*Primary Examiner* — Scott A Browne
(74) *Attorney, Agent, or Firm* — RatnerPrestia

(57) ABSTRACT

The invention relates to a composite wheel (200) including a hub (202), a rim (204) and a connection structure (206) connecting the hub (202) to the rim (204). The hub (202) has front (208) and rear (209) faces and is formed with one or more mounting formations (216) for, in use, receiving a fastener to mount the hub (202) to a mounting surface of a vehicle. Each mounting formation (216) includes a fastening region (218) recessed into the front face (208) of the hub (Continued)

(202) and includes a fastener aperture (212) defining a passage between the fastening region (218) and the rear face (209) of the hub. Each mounting formation (216) also includes a front-to-fastener ply (224) extending between a front region of the hub and the fastening region (218) for, in use, transferring load between the front region of the hub (202) and the fastening region (218).

27 Claims, 4 Drawing Sheets

(51) Int. Cl.
  *B60B 3/16* (2006.01)
  *B60B 3/10* (2006.01)
(52) U.S. Cl.
  CPC ............... *B60B 2310/52* (2013.01); *B60B 2360/3416* (2013.01); *B60B 2360/36* (2013.01)

(56) References Cited

U.S. PATENT DOCUMENTS

| | | | |
|---|---|---|---|
| 2014/0049096 A1* | 2/2014 | Hess | B60B 5/02 |
| | | | 301/95.101 |
| 2014/0346845 A1* | 11/2014 | Renner | B60B 3/004 |
| | | | 301/64.704 |
| 2015/0328922 A1* | 11/2015 | Dingle | B32B 5/12 |
| | | | 156/60 |
| 2016/0193869 A1* | 7/2016 | Renner | B29C 66/721 |
| | | | 29/894.342 |
| 2016/0200138 A1 | 7/2016 | Wagner et al. | |

FOREIGN PATENT DOCUMENTS

| | | |
|---|---|---|
| DE | 10 2015 006652 A1 | 4/2016 |
| DE | 10 2015 203900 A1 | 9/2016 |
| DE | 10 2016 210 756 A1 | 12/2016 |
| JP | S63-51801 U | 4/1988 |
| KR | 20150094085 A * | 8/2015 |
| WO | WO-2012/087117 A1 | 6/2012 |

* cited by examiner

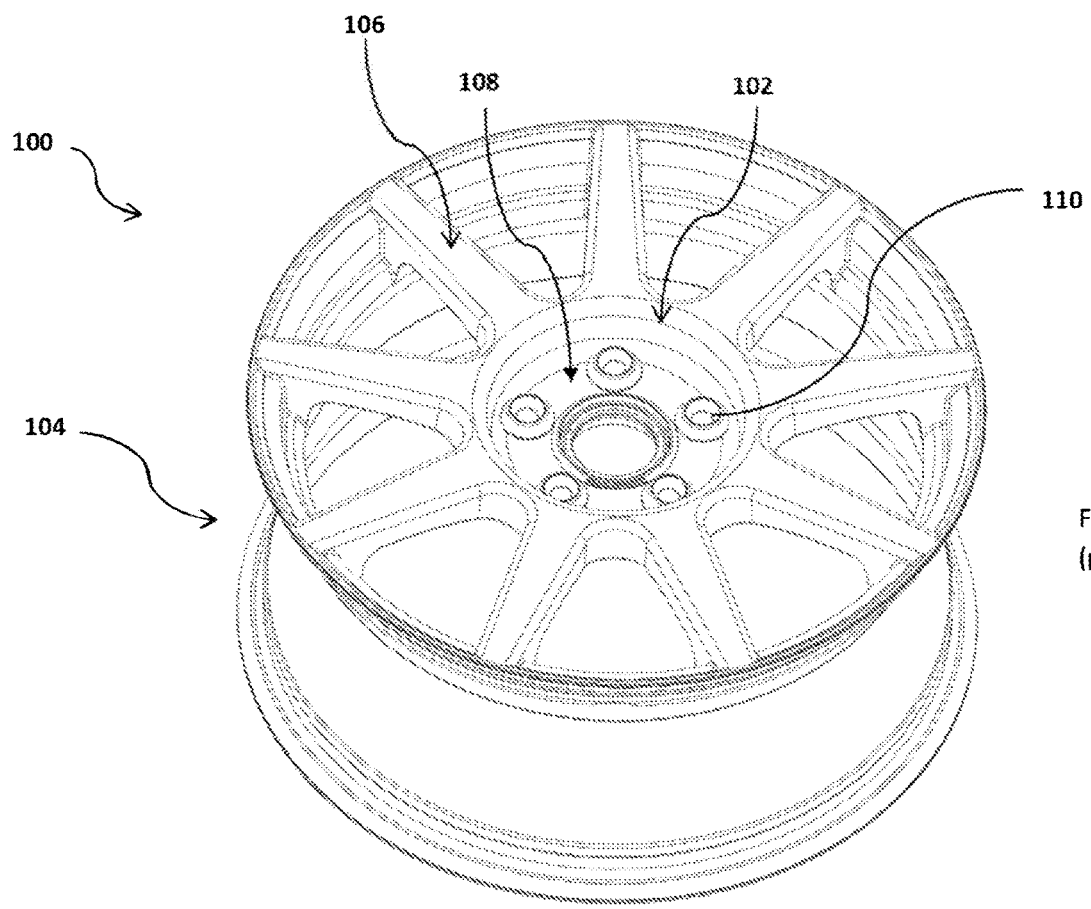
Figure 1
(prior art)
Figure 2
(prior art)
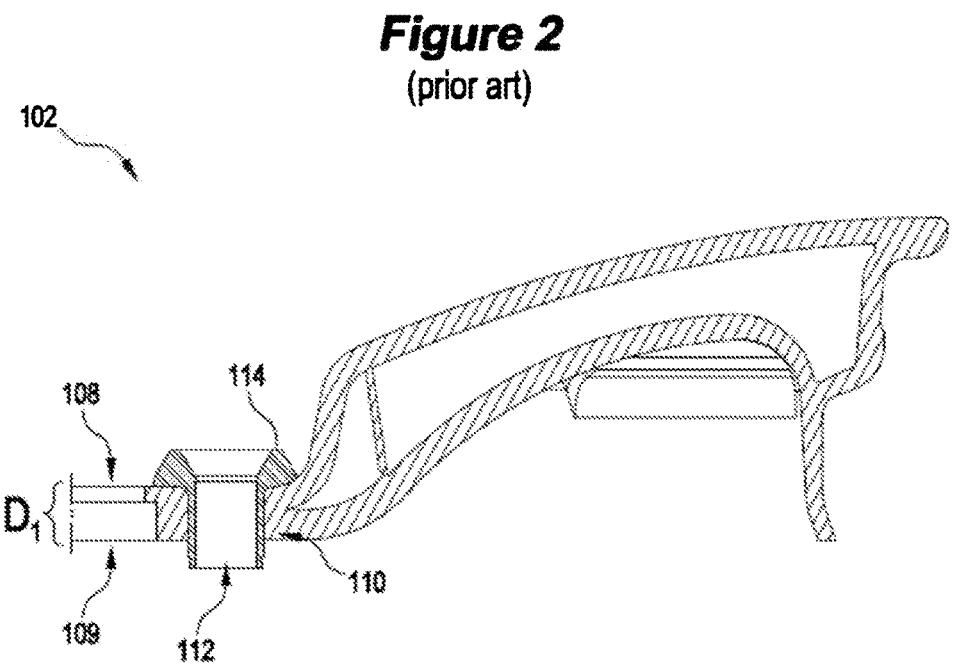

COMPOSITE WHEEL WITH IMPROVED MOUNTING FORMATION

CROSS REFERENCE TO RELATED APPLICATIONS

The present application is a U.S. National Stage of International Application No. PCT/AU2018/050794, filed Jul. 31, 2018, which claims priority to Australian provisional patent application No. 2017903336 filed Aug. 18, 2017, the entire disclosures of which are hereby incorporated by reference.

TECHNICAL FIELD

The present invention relates to composite wheels and, more particularly, an improvement to the mounting formation on the hub of a composite wheel. The invention is particularly applicable to composite carbon fibre wheels for vehicles and/or aeroplanes and it will be convenient to hereinafter disclose the invention in relation to that exemplary application. However, it is to be appreciated that the invention is not limited to that application and could be used in wheels for a large variety of alternative applications.

BACKGROUND OF INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Composite wheel stiffness is desirable to provide a mechanically efficient structure which can effectively transmit loads between the tyre and the vehicle suspension system. In this regard, the Applicant has previously produced a one-piece composite wheel, which is described in International Patent Publication WO2010/025495A1. The provision of a one-piece composite wheel which is moulded as a single component provides a desirable increase in stiffness as compared to composite wheels assembled from a number of separate composite components.

A composite wheel, such as the wheel described in WO2010/025495A1, generally includes two main sections, a rim portion and a face portion. The rim portion comprises an annulus structure configured to receive and seat a tyre. The face portion includes a hub which is used to fix the wheel to the vehicle, and a connection structure such as a series of spokes or a disc which connects the hub and the rim. The face portion of a hollow spoke wheel has a pair of opposing sides comprising a 'front' (i.e. outside) of the face portion (e.g. a front laminate) which faces outwardly from the vehicle and a 'rear' (i.e. inside) of the face portion (e.g. a rear laminate) facing toward the brake and rotor assembly. Lateral, vertical and torsional loads are transmitted through the tyre to the rim portion of the wheel which then produce bending and torsional stresses in the connection structure and the hub of the wheel which is connected to the vehicle.

Wheel hubs are typically formed with one or more mounting formations for connecting the wheel to a vehicle. Each mounting formation includes an attachment hole extending between the opposing front and rear sides of the hub for attaching the wheel to a vehicle mounting surface on the brake and rotor assembly. In a typical mounting arrangement, the wheel is mounted to a number of externally threaded wheel studs which extend from the mounting surface and through the attachment holes in the hub. Internally threaded wheel nuts are fitted to the ends of the wheel studs thus clamping the hub between the nuts and the mounting surface and securing the wheel to the vehicle. In an alternative mounting system, externally threaded wheel bolts are placed through the attachment holes and engage with corresponding bolt holes in the mounting surface. In either arrangement, the region of the hub beneath each wheel nut (or bolt head) defines a fastening region through which significant torsional and bending loads are transferred between the wheel and the vehicle.

In order to improve overall composite wheel performance, it is desirable to further improve the strength and stiffness of the fastening regions in the hub of a composite wheel. One way in which stiffness can be improved is to increase the thickness of the wheel hub. However, in order to accommodate wheel studs of standard length, it is necessary to provide a counterbore in the front face of the hub in which the wheel nuts can be recessed so as to permit connection of the wheel nuts to the end of the wheel studs.

Counterbores are generally undesirable in the field of composite materials due to an increased risk of delamination within the plurality of composite layers that form the composite structure. A conventional counterbore, for example a counterbore which is drilled into the hub of a metallic wheel, is not suitable for a composite wheel because the recessed nut would clamp only the composite layers beneath the nut and fail to clamp the layers through which the counterbore extends. This creates a significantly increased risk of delamination between the clamped layers (i.e. the layers between the nut and the mounting surface) and the unclamped layers (the layers through which the counterbore extends).

For this reason, the use of counterbores in composite materials has generally been avoided. For example, previous composite wheel designs, such as the wheel described in WO2010/025495A1 and illustrated in FIG. 1, include a wheel hub recessed below the front face of the wheel spokes forming a 'dished' profile. Recessing the wheel hub in this manner provides a hub which is sufficiently thin to accommodate lug bolts of standard length and in which all composite layers within the hub can be clamped by the wheel nut. Nonetheless, the requirement to use a recessed and flat wheel hub imposes a restriction on design freedom in terms of wheel aesthetics as well as a restriction on improvements to wheel stiffness.

Another existing composite wheel is disclosed in US patent publication 2014/0049096. This wheel is comprised of a plastics material and includes an adapter to facilitate the mounting of the wheel to a wheel mounting via fastening means. Wheel fastening means pass through the adapter such that no plastics material of the wheel lies in the flux of force of the fastening means. To allow a force transmission between the wheel mounting and the adapter by friction, the adapter is formed a harder material than the plastic material of wheel and preferably from a metallic material such as steel or cast-iron. Another previous wheel is disclosed in German patent publication DE102015203900. This publication discloses a two-part fastening element for mounting a wheel, having a plastic rim, to a vehicle axle.

The configurations disclosed in each of the above publications involve the provision of a discrete adapter or fastening element which is typically formed from a stronger material, for example metal, as compared to the plastic wheel. The provision of discrete and removable components, particularly ones formed from a metallic material is undesirable insofar as they add complexity, weight and cost to the wheel.

In view of the above, it is desirable to provide a composite wheel having a new or improved fastening region which permits increased hub thickness whilst maintaining compatibility with standard length wheel lugs and also maintaining sufficient resistance to composite layer delamination.

SUMMARY OF INVENTION

According to the present invention there is provided, a composite wheel including a hub, a rim and a connection structure connecting the hub to the rim, the hub having front and rear faces and the hub being formed with one or more mounting formations for, in use, receiving a fastener to mount the hub to a mounting surface of a vehicle, each mounting formation including: a fastening region recessed into the front face of the hub and including a fastener aperture defining a passage between the fastening region and the rear face of the hub; and a front-to-fastener ply integrally formed in the composite wheel and extending between a front region of the hub and the fastening region for, in use, transferring load between the front region of the hub and the fastening region.

The present invention advantageously provides a composite wheel formed with a recessed fastening region thereby permitting increased hub thickness whilst still accommodating standard length wheel lugs. In order to address the above-noted problem with recessed or counter-bored fastening regions, the composite wheel is advantageously formed with a front-to-fastener composite ply configured to transfer load between the fastening region and the front region of the wheel hub.

In contrast with existing composite wheels such as the wheel described in WO2010/025495A1 in which the wheel hub is flat and recessed into the front face of the wheel, the present invention enables the front face of the hub to be generally aligned with the front face of the rim and/or connection structure and with only the fastening region(s) being recessed. In this manner, a substantial portion or a majority of the hub can be provided with an increased thickness to provide improved overall wheel stiffness. Furthermore, the use of a recessed fastening region removes the requirement for composite wheels to feature a recessed and flat wheel hub. Consequently, the present invention facilitates increased design freedom and supports the development of a variety of aesthetically improved or alternative wheel designs.

The present invention includes a ply, for example a ply of composite material such as a shaped preform, which structurally connects the recessed fastening region to the front region of the hub to improve load distribution.

The front-to-fastener ply may be provided as part of the composite wheel fibre architecture and arranged as part of the layup prior to moulding of the composite wheel. The front-to-fastener ply may be provided as a shaped preform to maintain a desired structure during the layup process. After moulding, the front-to-fastener ply can become integrally formed in the composite wheel, providing the desired improvement in load distribution without requiring the use of a discrete component such as an adapter member disclosed in US 2014/0049096 or the removable fastening element disclosed in DE102015203900. In contrast to these previous wheels, the present invention therefore does not rely on a large central adapter or fastening element. Indeed, neither of these prior wheels include a discrete ply which is arranged to extend between the fastening region and the front region of the hub for transferring load there between.

The front-to-fastener composite ply advantageously connects the clamping forces provided by the wheel fastener to the front region of the wheel thereby significantly reducing the possibility of delamination occurring between composite layers in the front and rear regions of the wheel hub. It will be appreciated by a person skilled in the art that delamination is a significant concern in composite materials. Structures having curved regions, for example curved laminates within a composite wheel will, in use, experience through-thickness stresses which are either tensile or compressive depending upon loading direction. Through-thickness stresses can sum to create forces having a tendency to separate the outer portions of the laminate and the greater the width of the laminate relative to its thickness, the greater the force tending to separate the outer portions from the inner portions. The front-to-fastener ply advantageously provides an alternate load path for the forces attempting to separate the outer portion of the wheel hub (i.e. the front face of the wheel hub) from the inner portions of the wheel hub. A portion of the separate forces can be directly transferred to the front-to-fastener ply as tensile stress which partially unloads the connection between the fastening region and the front face of the wheel hub.

The front-to-fastener ply can extend generally perpendicularly to the orientation of the other composite layers which form the hub. In this manner, the front-to-fastener can traverse the plurality of composite layers in the hub and connect these layers to the recessed wheel fastener. The present invention thereby provides an alternative and improved composite material architecture which facilitates the use of recessed fastening regions or counterbore formations in the face of the hub. Consequentially, the present invention enables a desirable increase in thickness between the front and rear faces of the hub and an advantageous increase in wheel stiffness and structural efficiency.

The present invention can provide a composite wheel having a recessed or countersunk fastening aperture and a front-to-fastener ply which operates as a connection structure to connect the fastening aperture to the front region of the hub. The front-to-fastener ply advantageously transmits load to the front face or front region of the wheel. Layers of composite material which would otherwise be spaced apart from the fastener or bolted-joint region can be directly connected to the fastener via the front-to-fastener ply. Whilst all layers within a composite laminate are nonetheless 'connected' via the cured matrix material (typically resin) it will be appreciated that resin is significantly weaker in tensile yield strength as compared to the fibre material and that delamination can occur when resin strength is exceeded. Accordingly, the provision of a composite fibre ply which connects the fastener region to the front region of the wheel provides a significant improvement in strength as compared to a laminate in which front and rear layers are connected by resin only.

The front-to-fastener ply can be formed in any suitable configuration for connecting the fastener/bolting region of the wheel to the front region or front face of the hub. In a particular form of the invention, the front-to-fastener ply includes a fastener portion connected at the fastener region, a front portion connected at the hub front region and a connection portion extending between the fastener portion and the front portion. In a particular embodiment, the front portion extends from a front end of the connection portion and the fastener portion extends from a rear end of the connection portion.

In some embodiments, the front, rear and connection portions can consist of discrete structures. For example, the front portion can comprise a front flange connected at or adjacent to the front face of the hub, for example a flange extending from a front end of the connection portion. The rear portion can comprise a rear flange connected at the fastening region, for example a flange which extends from the rear end of the connection portion. The front portion can include a fastener opening forming part of the fastener aperture. In this embodiment, a fastener placed into the mounting formation of the cured composite wheel will therefore extend through the fastener opening in the front-to-connection ply and through the fastener aperture in the fastening region of the hub. This form of the invention can advantageously provide a mounting formation in which the fastener region of the front-to-fastener ply is clamped by the fastener (be it a wheel bolt or wheel nut) and therefore provides a secure connection through which loads can be transferred to the front region of the wheel hub via the front-to-fastener ply. The fastener opening in the fastener portion can be centrally located in the fastener portion. In alternative embodiments, the fastener opening can be non-centrally located or offset.

It will be appreciated that a composite wheel is formed from a laminate of fibre layers which are first stacked or laid-up in a particular arrangement or architecture before being injected with resin and cured to form an integrated composite structure. After the laminate structure of the composite wheel and the front-to-fastener ply is laid-up in the desired architecture, the fibres of the composite component are preferably injected and/or impregnated with a matrix material which is allowed to set/cure. In some embodiments, the matrix material comprises a resin. In this embodiment, the fibres of the composite wheel are preferably injected and/or impregnated with resin and then cured. Any suitable resin can be used. The resin is preferably based on unsaturated polyester, polyurethane, polyvinyl ester, epoxy, thermoplastics, similar chemical compounds or combinations thereof. In a preferred embodiment, the resin is epoxy-based. In other embodiments, the matrix material comprises a metal or composite metal material for example a metal matrix composite material such as carbon fibre within an aluminium matrix. A variety of resin delivery systems can be used in the manufacture of a composite wheel according to the present invention. In some embodiments, at least a part of the resin is provided by Resin Infusion and/or Resin Transfer Moulding and/or Vacuum Assisted Resin Transfer Moulding.

The location of the front-to-fastener ply within the composite laminate may vary whilst still achieving the advantages of the present invention. In a particular embodiment, the front portion of the front-to-fastener ply is connected to the front face of the hub. That is, the front portion can be positioned at the outermost layer of composite material in the wheel hub and the front portion can, itself, define a section of the front face. Alternatively, the front portion may be connected to the front region beneath the front face of the hub. For example the front portion can be embedded beneath the front face although nonetheless connected to the front region and capable of transmitting load to the front region. It will be appreciated that the front region of the hub includes the front layer of composite material as well as one or more layers of composite material beneath the front layer. In some embodiments of the invention it may be desirable to connect the front portion of the front-to-fastener ply at the front face. In alternative embodiments, sufficient delamination resistance between front and rear layers may be achieved without locating the front portion to the front-most layer of the wheel in which case the front portion can be located beneath the front face and the front portion need not necessarily be located at the front face.

The front-to-fastener composite ply can be integrated into the composite structure during manufacture of the composite wheel and, in particular, during the layup of the various fibrous layers, prior to moulding. It will be appreciated that, after moulding, each layer of composite material is connected to adjacent layers via the cured matrix material (typically resin) binding the various layers of composite material. References herein to 'connecting' the front-to-fastener ply to other layers or sections of the composite wheel will therefore be appreciated as references to the location of the ply. For example, in embodiments of the invention in which the front portion of the front-to-fastener ply is positioned at the front face of the wheel hub, after curing the front portion will be 'connected; to adjacent or abutting layers which make up the front face of the hub via the cured resin which connects adjacent layers. In this manner, the front-to-fastener ply will operate to transfer forces to and from the front face. In embodiments of the invention where the front portion is embedded into the composite layup beneath the front face, the front portion will be connected to the adjacent layers via the cured resin.

According to a particular embodiment of the invention, the connection portion of the front-to-fastener ply is generally tubular. This form of the invention provides a robust and high-strength structure which can be inserted into an annular recess in the front face of the hub. In some embodiments, the front portion flares outwardly from a front end of the tubular connection portion, for example the front portion can comprise an outwardly-flaring front flange. According to this form of the invention, the front flange can, during manufacture, be conveniently located at a desired position within the layup of composite layers. As noted above, the front flange can be located at the front-most face of the hub and therefore define a portion of the front face. Alternatively, the front flange can be embedded in the front region beneath the front face.

In an alternative embodiment, the front portion of the front-to-fastener ply does not comprise an outwardly-flaring front flange and may, instead, be defined by a front end of the connection portion, for example a front end of the tubular structure defining the connection portion. In this embodiment of the invention, the front region of the wheel hub may be connected to the front-to-fastener ply by, for example, overlapping one or more layers in the front region of the wheel hub with the front end of the tubular connection section. In this manner, the front end of the tubular connection section (i.e. the front portion) can be connected to the front region of the wheel hub without the use of an outwardly flaring flange.

The fastener portion can flare inwardly from a rear end of the tubular connection portion, for example the fastener portion can comprise an inwardly-flaring flange. As noted above, the fastener portion can include a centrally located fastener opening and so the inwardly-flaring flange can include a centrally located opening which forms part of the fastener aperture in the recessed fastening region. The tubular connection section may be provided in a variety of cross-sections, for example, a circular cross section in which the connection section may be generally cylindrical. Alternatively, the tubular cross section may be provided with a non-circular cross section for example a square, tear-drop shaped, octagonal or any other cross sectional profile. The connection section may, in some embodiments, taper toward one end to define a conical shape. In a particular embodiment, the connection section defines a conical tube tapered toward its rear end.

In some forms of the invention, the composite wheel will include a single, mounting formation centrally located in the wheel hub. This form of the invention may be particularly desirable when the present invention is used in a wheel for a racing vehicle which is typically connected to the vehicle mounting surface with a single fastener. In alternative embodiments, a composite wheel according to the present invention can include a plurality of mounting formations, each including a recessed fastening region and an associated front-to-fastener ply. This form of the invention is suitable for use as a conventional wheel which is connected to the vehicle mounting surface with a number of fasteners spaced equidistantly around the perimeter of the wheel hub.

The front-to-fastener ply can include a plurality of fibres extending continuously between the fastening portion and the front portion. That is, the ply can be formed from continuous fibres which extend through the whole length of the connection portion. This form of the invention is advantageous in that the front-to-fastener ply will have maximum strength and optimum load distribution. The front to the front-to-fastener ply can be formed from the same fibre material as the remainder of the composite wheel so as to provide ideal adherence. In alternative embodiments, it may be desirable for the front-to-fastener ply to comprise an alternative fibre material having different properties from that of the composite layers in the remainder of the wheel hub.

The fibre arrangement of the front-to-fastener ply can be provided in a variety of arrangements. The ply can comprise a braided composite laminate for example a braided laminate having a +/45° fibre alignment. Alternatively, the ply can comprise a bi-axial braid, tri-axial braid or a woven or stitched fabric. The front-to-fastener ply can include single-direction fibres or multi-directional fibres. The ply could include one or more layers of multi directional fibre plies for example a stitched non-crimp fabric. The ply can consist of a fibre patch placement preform or non-woven isotropic or anisotropic fibre layers or recycled carbon nonwoven fibres. The fibres may also be oriented in a biaxial or random arrangement or a combination of two or more of the above noted arrangements or fibre types.

A wide variety of fibres may be used in the present invention, including but not limited to fibres selected from the group consisting of carbon fibres, glass fibres, aramid fibres, synthetic fibres such as acrylic, polyester, PAN, PET, PE, PP or PBO-fibres, or the like, bio fibres such as hemp, jute, cellulose fibres, or the like, mineral fibres for example Rockwool or the like, metal fibres for example steel, aluminium, brass, copper, or the like, boron fibres or any combination of these. In a preferred embodiment, the front-to-fastener ply comprises carbon fibres.

The fastener portion of the front-to-fastener ply can define a bolting surface which, in use, is clamped by a fastener such as a wheel nut or a bolt head. In alternative embodiments, a washer may be positioned between the fastener and the fastener portion of the front-to-fastener ply. The Applicant has previously produced a specialised composite wheel attachment arrangement described in International Patent Publication WO2013/000009. This arrangement includes an elongate washer designed to distribute clamping pressure over a larger surface thereby reducing the possibility of damage to the composite surface due to clamping pressure. Accordingly, a composite wheel according to the present invention can include an elongate washer seated upon the fastener portion and extending through the fastener opening and fastener aperture toward the rear face of the wheel hub.

The front-to-fastener ply can be provided as a single piece of composite material lining the inside of a recess in the front face of the wheel hub such that each mounting formation is provided with a single front-to-fastener ply. In alternative embodiments, the front-to-fastener ply could comprise a 'strip' of composite material and the recess of each mounting formation could be lined with two or more front-to-fastener plies, each comprising a strip of composite material connecting the fastening region to the front region of the wheel hub.

According to a second aspect of the present invention there is provided a pre-formed composite insert for use in the formation of a composite wheel hub to connect a front region of the hub to a fastener region recessed below the front region of the hub, the insert being, in use, integrally formed in the composite wheel and the insert including: a front portion for connection to the front region of the hub; a rear portion for connection to the fastener region of the hub; and a connection portion extending between and connecting the front and rear portions.

The pre-formed composite insert of the second aspect of the present invention may generally include the above-described features, materials and arrangements of the front-to-fastener ply in respect of the first aspect of the present invention. The pre-formed composite insert may include a rear portion having a fastener aperture and the connection portion can be generally tubular and can comprise a circular cross section. Alternatively, the tubular cross section may have a non-circular cross section for example a tear-shaped or oval cross section. The front portion can comprise a front flange flaring outwardly from a front end of the tubular portion. The rear portion can include a rear flange flaring inwardly from a rear end of the tubular portion.

In contrast to previous wheels such as those disclosed in US patent publication 2014/0049096 and German patent publication DE102015203900, the preformed insert according to this aspect of the invention is formed from a composite material and is adapted for integral formation with a composite wheel during the moulding process. The present invention is thereby simplified and lighter as compared to these previous systems which include upon large, heavy and costly adapter/fastening elements.

It will be appreciated that the provision of front and rear flanges provides a convenient means by which to connect the front end and rear ends of the insert with the respective front region and fastening regions of the composite wheel. However in particular forms of the invention the insert need not necessarily include the front and rear flanges. The front portion of the insert may, in some embodiments, be defined by a front end of the tubular structure which defines the connection portion. In these embodiments, the front end of the tubular structure may simply be overlapped or otherwise embedded with composite layers in the front region of the wheel hub and therefore the insert need not necessarily include a front flange.

The pre-formed composite insert can be formed of any composite material and in any fibre arrangement. In a particular form of the invention the insert is formed from carbon fibre. In alternative forms of the invention the insert is formed from glass fibre. It will be appreciated that a wide variety of composite materials is possible including carbon fibres, glass fibres, aramid fibres, synthetic fibres such as acrylic, polyester, PAN, PET, PE, PP or PBO-fibres, or the like, bio fibres such as hemp, jute, cellulose fibres, or the like, mineral fibres for example Rockwool or the like, metal fibres for example steel, aluminium, brass, copper, or the like, boron fibres or any combination of these.

According to a particular embodiment the insert is formed from a plurality of continuous fibres which extend through each of the front, rear and connection portions. The continuous fibres may be braided and, in a particular form of the invention, the braided fibres are bi-axial braided fibres. The insert could be woven or include tailored fibre placement plies or preforms, unidirectional or multi-directional fibres or could incorporate fibre patch placement preforms. The insert may also include non-woven isotropic or anisotropic fibre layers and recycled nonwoven carbon fibres. The insert may be provided in any suitable form including in prepregs, semi-pregs, woven or non-woven fabric, a mat, a pre-form, a pre-consolidated pre-form, individual or groups of fibres, tows, tow-pregs, or the like.

The first and second aspects of the present invention enable improved distribution of the clamping forces applied by the wheel fastener (i.e. a wheel nut or a wheel bolt). In particular, the front-to-fastener ply or pre-formed composite insert operates to extend clamping forces to the front of the wheel so as to reduce the possibility of delamination caused by the recessed fastening region. The present invention enables therefore a composite wheel to have a highly stiff hub whilst still accommodating standard length wheel lugs and whilst maintaining sufficient delamination resistance.

BRIEF DESCRIPTION OF DRAWINGS

The present invention will now be described with reference to the figures of the accompanying drawings, which illustrate particular preferred embodiments of the present invention, wherein:

FIG. 1 illustrates an example of a prior art composite wheel previously produced by the Applicant.

FIG. 2 illustrates a cross section of the fastening region in the composite wheel illustrated in FIG. 1.

DETAILED DESCRIPTION

Figure 3:
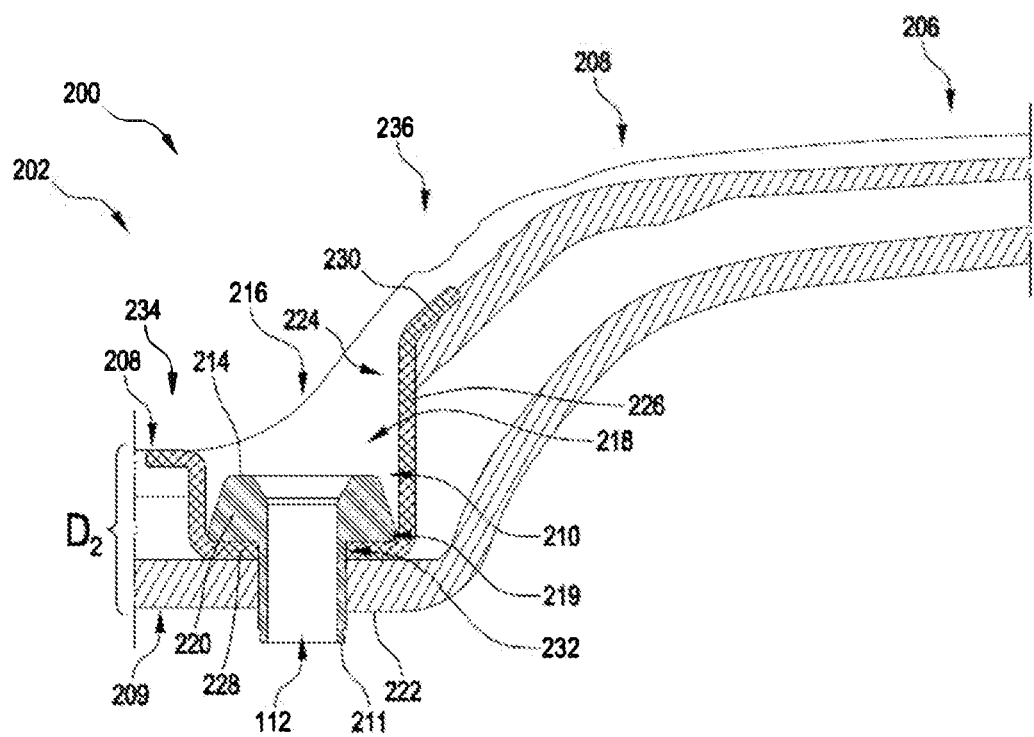
FIG. 3 illustrates a partial cross section of a composite wheel formed with a front-to-fastener ply according to a first embodiment of the present invention.

Referring to FIG. 1, there is illustrated a perspective view of a prior art composite wheel 100 having a hub 102, a rim 104 and a connection structure comprising a plurality of spokes 106 connecting the hub 102 to the rim 104. Hub 102 includes a hub front face 108 which is recessed below the front face of the spokes 106.

The Applicant has previously produced the specialised composite wheel attachment arrangement described in International Patent Publication WO2013/000009. This arrangement includes an elongate washer designed to distribute clamping pressure over a larger surface thereby reducing the possibility of damage to the composite surface due to clamping pressure. Hub 102 in FIG. 1 is provided with five elongate washers 110 which are described in the Applicant's previous International Patent Publication WO2013/000009.

Each elongate washer 110 is located within a respective attachment opening 112 extending between the front hub face 108 and rear hub face 109, as best illustrated in FIG. 2. When mounted to a vehicle mounting surface, the openings 112 are mounted to a respective wheel lug extending outwardly from the vehicle brake/rotor assembly. The distal end of each wheel lug is then fitted with a wheel nut which is tightened and clamps down upon the front edge 114 of the elongate washer 110. During manufacture, the rear ends of washers 110 are flared.

As illustrated by the cross-sectional perspective in FIG. 2, the composite laminate which forms hub 102 is formed such that distance $D_1$ between the front and rear hub faces 108, 109 is relatively small. When mounted to a vehicle, a clamping force is thereby applied to all composite layers of the hub, including the hub front face 108. In this regard, recessed hub 102 provides a 'soap dish' profile in which the hub 102 is sufficiently thin to accommodate lug bolts of standard length and in which all composite layers within the hub can be clamped by the wheel nut.

Turning to FIG. 3, there is illustrated a partial cross section of a composite wheel 200 according to the present invention. Similar to the prior art composite wheel 100, composite wheel 200 includes a hub 202, a rim 204 and a connection structure comprising a plurality of spokes 206 connecting the hub 202 to the rim 204. However in contrast to prior art composite wheel 100, the composite wheel 200 according to the present invention is formed with a novel mounting formation 216 which includes a fastening region that is recessed into the front face 208 of the hub 202. The fastening region includes a fastening surface 219 and a fastener aperture 212 which defines a passage between the fastening surface 219 and the rear face of the hub 209. FIG. 3 illustrates a single mounting formation 216 although composite wheel 200 includes a plurality of mounting formations 216 spaced equidistantly around hub 202.

An elongate washer 210 is seated on the fastening surface 219 and extends through the passage defined by the fastener aperture 212. Before completion of the manufacturing process, the rear end 211 of the elongate washer 210 is flared outwardly with a flaring tool and engages the rear hub face 209. Elongate washer 210 functions in the same manner as elongate washer 110 insofar as an upper edge 214 is, during use, clamped by a wheel nut fitted to the end of a wheel stud extending through fastener aperture 212. In alternative mounting arrangements, a mounting bolt may be placed into the fastener aperture 212 from the front side of the wheel 200 with the head of the bolt therefore providing the clamping force on the front edge 214 of elongate washer 110.

Elongate washer 210 includes a head portion 220 seated on the fastening surface 219 and a tail portion 222 extending through the passage defined by fastener aperture 212. As illustrated in FIG. 2, a rear side of the head portion 220 contacts fastening surface 219 and thereby, upon clamping of elongate washer 210 by a suitable wheel bolt or wheel nut, a clamping load is applied to fastening surface 218. It will be noted that elongate washer 210 is approximately the same length as elongate washer 110 illustrated in FIG. 2. In this regard, the recessed fastening surface 219 is sufficiently close to the rear surface 209 so as to permit the use of standard wheel lugs. As discussed in the foregoing, it is desirable to increase distance $D_1$ so as to improve overall hub stiffness. The provision of a fastening region 218 which is recessed into the front hub face 208 enables the distance $D_2$ between the front hub face 208 and rear hub face 209 to be significantly larger than the distance $D_1$ in the prior art arrangement illustrated in FIG. 2.

The mounting formation 216 of composite wheel 200 further includes a front-to-fastener ply 224 which connects and, in use, transfers load between the fastening region 218 and the hub front face 208. The front-to-fastener ply 224 includes a fastening portion, a front portion and a tubular connection portion 226 connecting the fastening portion and the front portion. The fastening portion comprises a rear flange 228 extending radially inwardly from a rear end of connection portion 226. The front portion comprises a front flange 230 extending radially outwardly from the front end of connection portion 226. In some embodiments of the invention, the front flange 230 can extend radially outwardly at a generally perpendicular orientation to the axis of the tubular connection portion 226. Alternatively, the front flange can extend radially outwardly at an angle less than 90°. The angle between the front flange 230 and the tubular connection portion 226 may vary. As illustrated in FIG. 3, the left-hand side of the front flange 230 extends generally perpendicularly to the tubular connection section whereas the right-hand side of the front flange 230 extends radially outwardly at approximately 45° from the tubular connection portion 226.

Front flange 230 is located at the front of hub 202 and, after curing of the composite component, forms a portion of front face 208. Front flange 230 is thereby connected to the surrounding composite layers at the front region of composite wheel 200. Rear flange 228 is located within the fastening region 218 of mounting formation 216 and defines the bolting surface 219 upon which the head 220 of the elongate washer 210 is seated. A fastener opening 232 is centrally located in rear flange 228. Fastener opening 232 forms part of fastener aperture 212 through which the tail portion 222 of elongate washer 210 extends.

The rear flange 228 is seated beneath the bolted joint formed when the wheel nut is fitted to the wheel lug. In use, clamping load is applied to the fastening surface 219 on rear flange 228 and is transferred through connection portion 226 to the front flange 230 connected at the front face 208 of hub 202 and to the front of composite wheel 200. In this way, the bolted joint or fastening region of the wheel can be recessed so as to permit a larger hub thickness $D_2$ whilst connecting the front side of the wheel to the fastening region so as to maintain sufficient delamination resistance between front and rear composite layers of the hub 202.

Still referring to FIG. 3, front-to-fastener ply 224 includes an outboard side 236 arranged on the outboard side of mounting formation 216 (i.e. arranged toward rim 204) and an opposing inboard side 234 arranged on the inboard side of mounting formation 216 (i.e. toward the centre of hub 202). As illustrated in FIG. 3, the distance between fastening surface 219 and the front face 208 is slightly greater on the outboard side 236 of mounting formation 216. Front-to-fastener ply 224 is shaped to correspond with the profile of mounting formation 216. Accordingly, connection portion 226 is slightly longer on the outboard side 236 as compared to the inboard side of connection portion 226.

Figure 4:
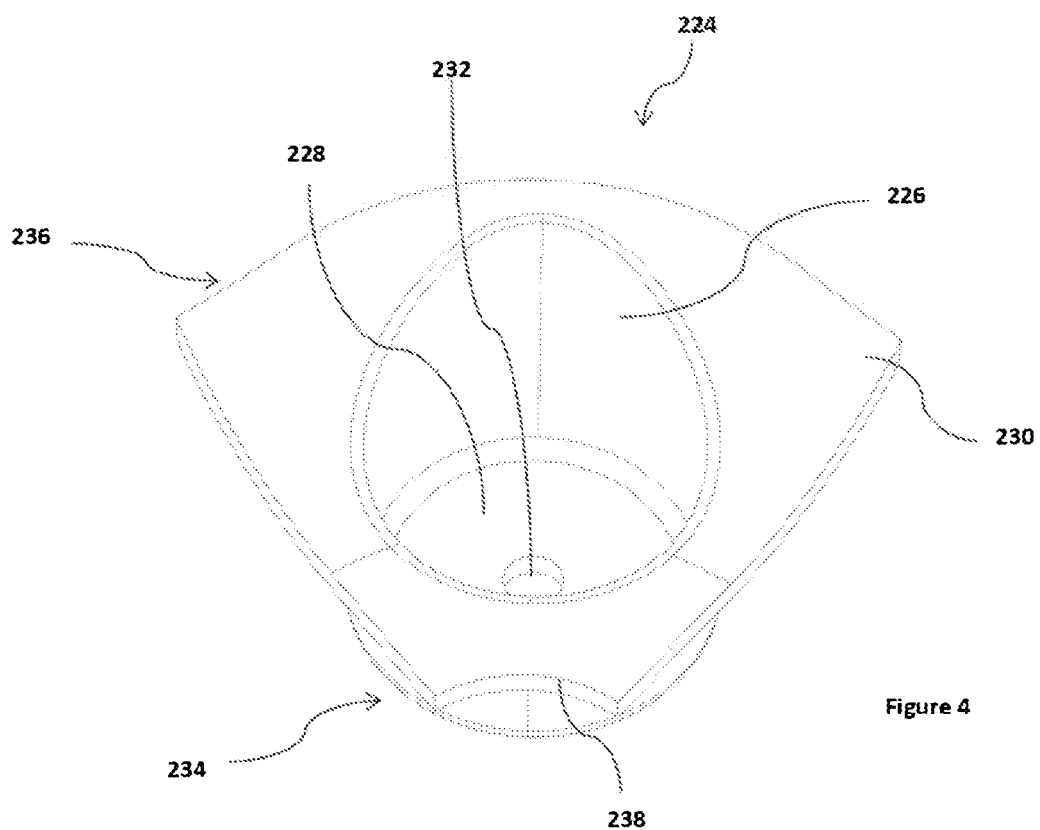
FIG. 4 illustrates a perspective view of the front-to-fastener ply illustrated in FIG. 3.

FIG. 4 provides a perspective view of the front-to-fastener ply 224 prior to layup in the manufacture a composite wheel. The front-to-fastener ply 224 comprises a preformed composite insert comprising front flange 230, rear flange 228 and a tear-shaped connection portion 226 connecting the front and rear flanges 230, 228. A portion of fastener opening 232 is shown in rear flange 228. The front-to-fastener ply 224 illustrated in FIG. 4 can be formed from a +/−45° biaxial braided fibre orientation. The front-to-fastener ply 224 is comprised of continuous fibres which extend through the rear flange 232, connection section 226 and the front flange 230. That is, each of the three portions of ply 224 is connected by a plurality of continuous fibres and without joints to, in use, provide optimum load transmission capability.

Still referring to FIG. 4, front-to-fastener ply 224 includes an outboard side 236 and an opposing inboard side 234. Flange 230 is shaped so as to conform to the hub front face surrounding the mounting formation in composite wheel 200. As illustrated in FIG. 4, front flange 230 is generally triangular. The outboard side 236 of flange 230 is longer than the inboard side 234 of flange 230. The inboard side of flange 230 further includes a cut-out 238 to accommodate centre bore 240 of wheel 200 (best illustrated in FIG. 5).

Figure 5:
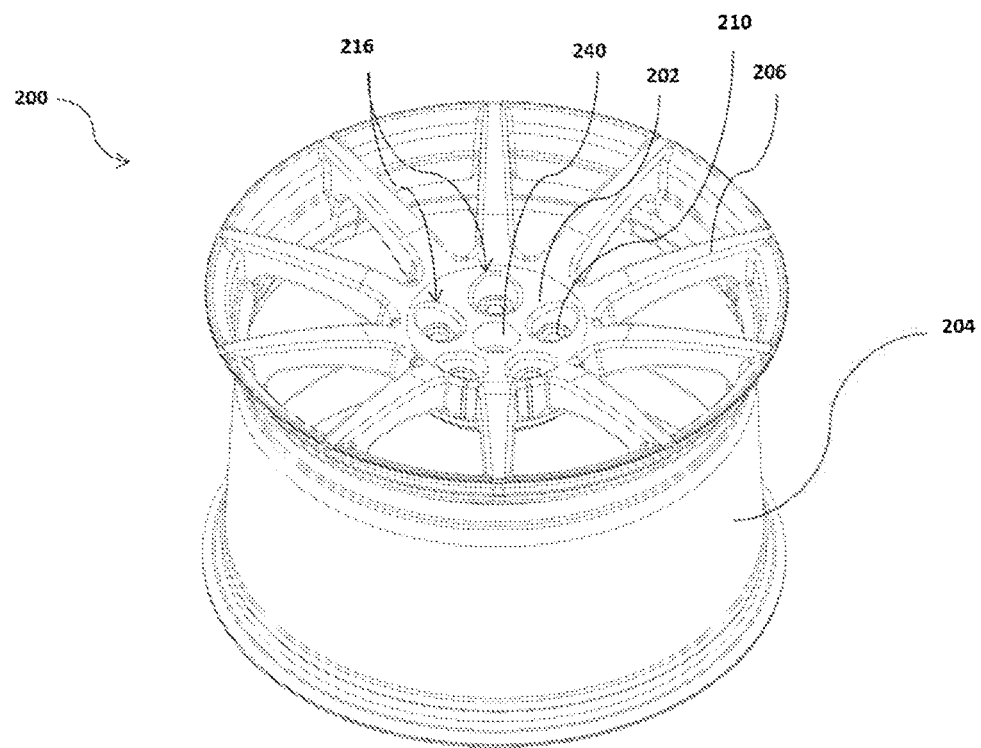
FIG. 5 illustrates a composite wheel according to an embodiment of the present invention.

FIG. 5 provides a wider perspective of composite wheel 200 partially illustrated in FIG. 3. Composite wheel 200 includes a plurality of spokes 206 connecting a central hub 202 and to annular rim 204. Hub 202 includes five mounting formations 216 arranged circumferentially around centre bore 240. As illustrated in FIG. 5, washers 210 are counter sunk beneath the front face of hub 202. In contrast to hub 102 illustrated in FIG. 1, hub 202 of the present invention does not comprise a 'soap dish' profile. The front face of hub 202 is not recessed beneath the front face of the spokes. Instead the outboard edge of the hub is generally flush with the inboard edge spokes 206. As such, hub 202 has a greater thickness than prior art hub 102 so as to provide improved stiffness and mechanical performance. These improvements are enabled by the provision of mounting formations 216 with countersunk fastening regions which, in turn, are enabled by the front-to-fastener ply 224 illustrated in FIGS. 3 and 4.

Figure 6:
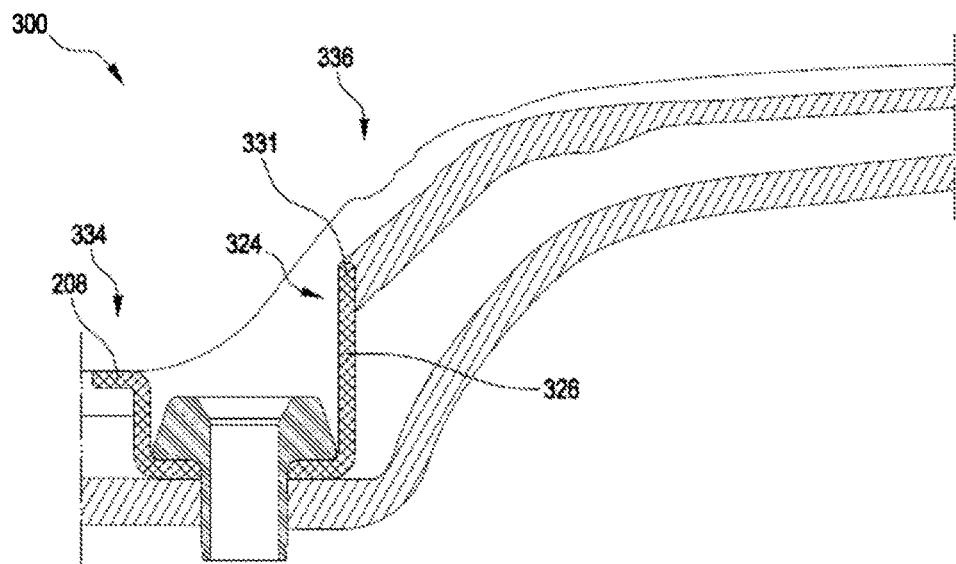
FIG. 6 illustrates a partial cross section of a composite wheel formed with a front-to-fastener ply according to a second embodiment of the present invention.

Turning to FIG. 6, a second embodiment of the present invention includes a front-to-fastener ply 324 which is modified from the first embodiment front-to-fastener ply 224 illustrated in FIG. 3. The second embodiment front-to-fastener ply 324 is generally equivalent to the first embodiment front-to-fastener ply except the front flange has been omitted on the outboard side 336 of ply 324. The front portion of ply 324 is connected to the front region of wheel 300. The front portion of ply 324 comprises, on the inboard side 334, a front flange 330 and, on the outboard side 336, the front end 331 of connection portion 326. At the outboard side, the front end 331 of connection portion 326 is connected at the front face of hub without the use of the outwardly flaring present in the first embodiment.

Figure 7:
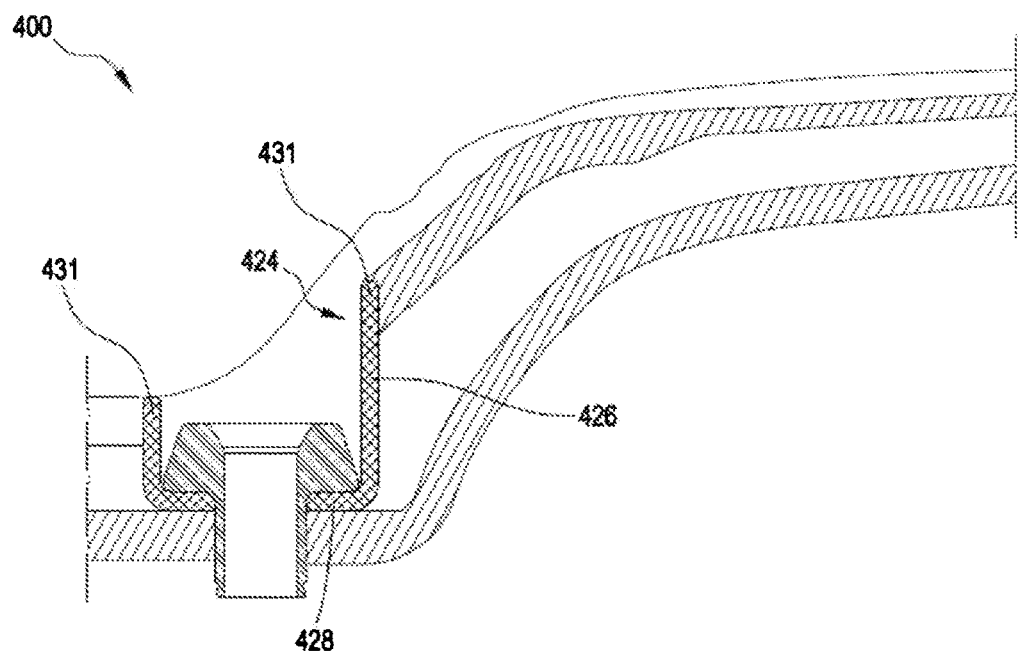
FIG. 7 illustrates a partial cross section of a composite wheel formed with a front-to-fastener ply according to a third embodiment of the present invention.

A further variation on the front portion of the front-to-fastener ply is provided in FIG. 7 which illustrates a third embodiment of the present invention. In particular, FIG. 7 illustrates a composite wheel 400 including a front-to-fastener ply 424 in which no outwardly flaring flange is present. The front portion of the ply 424 is comprised of the front end 431 of connection portion 426. Front end 421 connects rear flange 428 to the front face of hub 402 without the use of any outwardly flaring flange.

Figure 8:
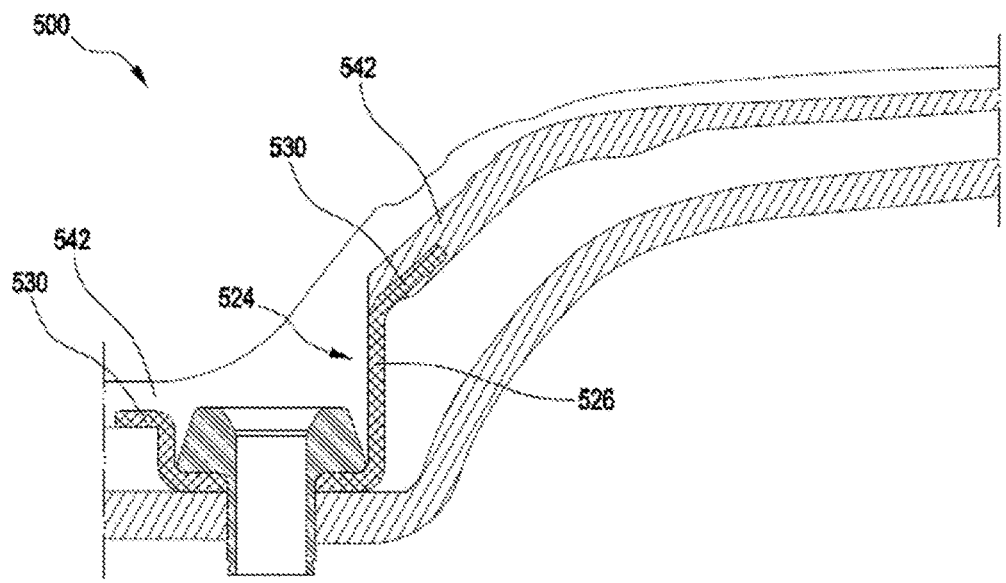
FIG. 8 illustrates a partial cross section of a composite wheel formed with a front-to-fastener ply according to a fourth embodiment of the present invention.

Turning to FIG. 8, there is illustrated an fourth embodiment of the present invention in which the front portion of front-to-fastener ply 524 is comprised of front flange 530 extending circumferentially and flaring outwardly from connection portion 526, similar to the first embodiment. However, in contrast to the first embodiment, front flange 530 is embedded beneath the outer composite layers 542 at the front face of wheel 500. As such, front flange 530 is connected to the front region of wheel 502 but not at the front face of wheel 502 in the manner illustrated in the previous embodiments.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The claims defining the invention are as follows:

1. A composite wheel including a hub, a rim and a connection structure connecting the hub to the rim, the hub having front face and a rear face, and the hub being formed with one or more mounting formations for, in use, receiving a fastener to mount the hub to a mounting surface of a vehicle, each mounting formation including:
    a fastening region recessed into the front face of the hub and including a fastener aperture defining a passage between the fastening region and the rear face of the hub; and
    a front-to-fastener ply integrally formed in the composite wheel and extending between a front region of the hub and the fastening region, the front-to-fastener ply configured to transfer load between the front region of the hub and the fastening region, the front-to-fastener ply comprising a fibre material and including a fastener portion connected at the fastening region, a front portion connected at the front region of the hub and a tubular connection portion extending between the fastener portion and the front portion;
    wherein the fastening portion comprises a rear flange connected at the fastening region;
    wherein the composite wheel comprises a laminate comprising a plurality of fibre layers connected with cured resin to form an integrated composite structure, and the front-to-fastener ply comprises one or more of the plurality of fibre layers connected to one or more adjacent layers of the plurality of fibre layers via the cured resin.

2. The composite wheel according to claim 1, wherein the front portion extends from a front end of the connection portion and the fastening portion extends from a rear end of the connection portion.

3. The composite wheel according to claim 1, wherein the front portion comprises a front flange connected at, or adjacent to, the front face.

4. The composite wheel according to claim 1, wherein the front portion is connected to the front face of the hub.

5. The composite wheel according to claim 1, wherein the front portion is connected to the front region beneath the front face of the hub.

6. The composite wheel according to claim 1, the fastener portion including a fastener opening forming part of the fastener aperture and the fastener opening being centrally located in the fastener portion.

7. The composite wheel according to claim 1, the front portion flaring outwardly from a front end of the tubular connection portion and the fastener portion flaring inwardly from a rear end of the tubular connection portion.

8. The composite wheel according to claim 1, wherein the front portion and connection portion are comprised of a single tubular ply.

9. The composite wheel according to claim 1, the front-to-fastener ply including a plurality of fibres extending continuously between the fastening portion and the front portion.

10. The composite wheel according to claim 1, further including an elongate washer seated in the fastening region and extending through the fastener aperture.

11. The composite wheel of claim 1, wherein the fibre material in the front-to-fastener ply comprises a same fibre material as the fibre material in the adjacent one or more layers of the plurality of fibre layers.

12. The composite wheel of claim 11, wherein the fibre material in the front-to-fastener ply and in the adjacent one or more layers of the plurality of fibre layers comprises carbon fibre material.

13. The composite wheel of claim 1, wherein the fibre material in the front-to-fastener ply comprises a different fibre material having different properties than the fibre material in the adjacent one or more layers of the plurality of fibre layers.

14. The composite wheel of claim 1, wherein the fibre material in the front-to-fastener ply comprises a fibre selected from the group consisting of carbon fibres, glass fibres, aramid fibres, synthetic fibres, biological fibres, mineral fibres, metal fibres, and combinations thereof.

15. The composite wheel of claim 1, wherein the composite wheel includes a plurality of mounting formations, each mounting formation including a recessed fastener region and an associated front-to-fastener ply.

16. The composite wheel according to claim 15, wherein the mounting formations are arranged equidistantly around the hub.

17. The composite wheel according to claim 15, wherein the mounting formations are arranged co-radially with respect to a central axis of the wheel.

18. The composite wheel according to claim 1, wherein the tubular connection portion includes an inboard side of a first length and an outboard side of a second length different than the first length.

19. The composite wheel according to claim 18, wherein the second length is greater than the first length.

20. The composite wheel according to claim 19, wherein the outboard side of the tubular connection portion is located toward the connection structure and the inboard side of the tubular connection portion is located toward a central axis of the wheel.

21. A pre-formed composite insert configured to be integrally formed in a composite wheel hub to connect a front region of the hub to a fastener region recessed below the front region of the hub, the insert comprising a fibre material, the insert including:
    a front portion for connection to the front region of the hub;
    a rear portion for connection to the fastener region of the hub;
    a tubular connection portion extending between and connecting the front portion and the rear portion;
    wherein the pre-formed composite insert is configured for insertion in a laminate comprising a plurality of fibre layers connected with cured resin that form an integrated composite structure that defines the composite wheel hub, in which the pre-formed composite insert defines a front-to-fastener ply comprising one or more of the plurality of fibre layers connected to one or more adjacent fibre layers of the plurality of fibre layers via the cured resin;

wherein the rear portion comprises a rear flange flaring inwardly from a rear end of the tubular connection portion.

22. The pre-formed composite insert according to claim 21, wherein the rear portion includes a fastener aperture.

23. The pre-formed composite insert according to claim 21, wherein the tubular connection portion has a tear-shaped or oval cross-section.

24. The pre-formed composite insert according to claim 21, wherein the insert is formed from a plurality of continuous fibres which extend through each of the front, rear and connection portions.

25. A composite wheel including a pre-formed composite insert according to claim 21.

26. The composite wheel of claim 25, wherein the composite wheel comprises a laminate comprising a plurality of fibre layers impregnated with cured resin to form an integrated composite structure, and the pre-formed composite insert defines a front-to-fastener ply comprising one of the plurality of fibre layers connected to one or more adjacent layers of the plurality of fibre layers via the cured resin.

27. The pre-formed composite insert according to claim 21, wherein the front portion comprises a front flange flaring outwardly from a front end of the tubular connection portion.

* * * * *